(12) United States Patent
Lu

(10) Patent No.: US 7,679,932 B2
(45) Date of Patent: Mar. 16, 2010

(54) HOUSING MECHANISM WITH SHIELD FOR PORTABLE ELECTRONIC DEVICE

(75) Inventor: Yu-Lun Lu, Tainan Hsien (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 244 days.

(21) Appl. No.: 11/777,061

(22) Filed: Jul. 12, 2007

(65) Prior Publication Data

US 2008/0192455 A1    Aug. 14, 2008

(30) Foreign Application Priority Data

Feb. 9, 2007    (CN) .................. 2007 1 0073269

(51) Int. Cl.
*H05K 1/14*    (2006.01)
(52) U.S. Cl. ...................................... 361/800; 361/796

(58) Field of Classification Search ................ 361/681, 361/730, 752, 796, 800
See application file for complete search history.

(56) References Cited

U.S. PATENT DOCUMENTS

2007/0247793 A1*  10/2007  Carnevali .................... 361/681
2009/0009945 A1*  1/2009   Johnson et al. ............. 361/681
2009/0086415 A1*  4/2009   Chipping ............... 361/679.01

* cited by examiner

*Primary Examiner*—Jinhee J Lee
*Assistant Examiner*—Yuriy Semenenko
(74) *Attorney, Agent, or Firm*—Steven M. Reiss

(57) ABSTRACT

A housing mechanism (100) includes a main body (60) and a shield/cap (70). The main body accommodates an inner interface and defines a port (63) therein. The port is configured for allowing an outer interface to be inserted into the main body and for thereby engaging the outer interface with the inner interface. The shield is located near the port and is selectably rotatably positionable between a first position, in which the shield covers the port, and a second position, in which the shield does not cover the port. The first position and the second position cooperate to form an angle therebetween.

15 Claims, 5 Drawing Sheets

HOUSING MECHANISM WITH SHIELD FOR PORTABLE ELECTRONIC DEVICE

BACKGROUND OF THE INVENTION

1. Field of the Invention

The present invention generally relates to housing mechanisms of a portable electronic devices and, particularly, to a housing mechanism with a shield (i.e., a cap) configured (i.e., structured and arranged) for protecting a port defined in the housing mechanism.

2. Discussion of the Related Art

With the development of the technology of information processing, portable electronic devices such as digital cameras, MP3 players, video cameras, mobile phone, and personal digital assistants (PDAs) are now in widespread use. Connectors are important elements for transmitting data between portable electronic devices and/or for permitting charging of a battery therein (depending on the type of connection involved, of course).

In some electronic devices, the connector is pluggably fixed to/into a housing of a given electronic device. One end of the connector has an outer electronic interface provided therein. The housing of the electronic device has a port defined, e.g., in one sidewall thereof. An inner electronic interface is provided in the housing near the port. When the connector is used, the end having the outer electronic interface is inserted into the port of the housing of the electronic device, thereby engaging the outer electronic interface with the inner electronic interface. This engagement enables the data to be transmitted between varying electronic devices or for power to be applied thereto from a power source (e.g., a wall outlet). However, when no connector is connected to the electronic device, the inner electronic interface of the electronic device is liable to become polluted by dust or electrically shorted by moisture/fluid entering through the port and as a consequence, the performance of the inner electronic interface is susceptible to damage.

Therefore, a new housing mechanism with a port shield/cover is desired in order to overcome the above-described shortcoming.

SUMMARY

In one embodiment thereof, a housing mechanism includes a main body and a shield/cap. The main body accommodates an inner interface and defines a port therein. The port is configured for allowing an outer interface to be inserted into the main body, thereby engaging the outer interface with the inner interface. The shield is located near the port and may be selectably positioned in a first position, in which the shield covers the port, and a second position, in which the shield does not cover the port. The first position and the second position define an angle therebetween.

Other advantages and novel features of the embodiments will become more apparent from the following detailed description thereof when taken in conjunction with the accompanying drawings.

BRIEF DESCRIPTION OF THE DRAWINGS

Many aspects of the present housing mechanism can be better understood with reference to the following drawings. The components in the drawings are not necessarily to scale, the emphasis instead being placed upon clearly illustrating the principles of the present housing mechanism. Moreover, in the drawings, like reference numerals designate corresponding parts throughout the several views.

DETAILED DESCRIPTION OF THE EMBODIMENT

The present housing mechanism is particularly suitable for portable electronic devices such as digital cameras, MP3 players, video cameras, mobile phones, PDAs, and the like, but could find other applications in which a similar housing mechanism is employed.

Figure 1:
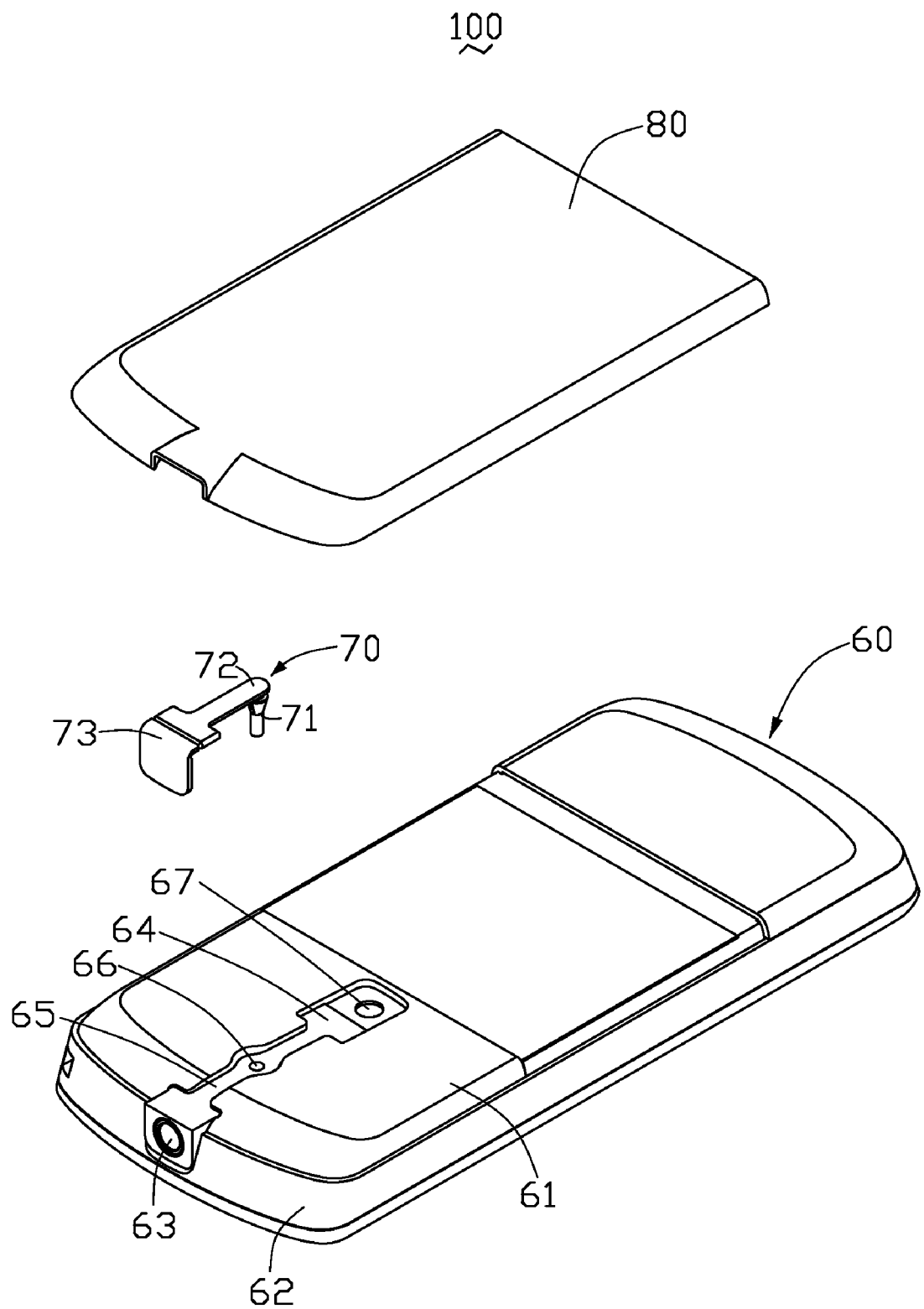
FIG. 1 is an exploded, isometric view of a housing mechanism having a shield, in accordance with a present embodiment.
Figure 2:
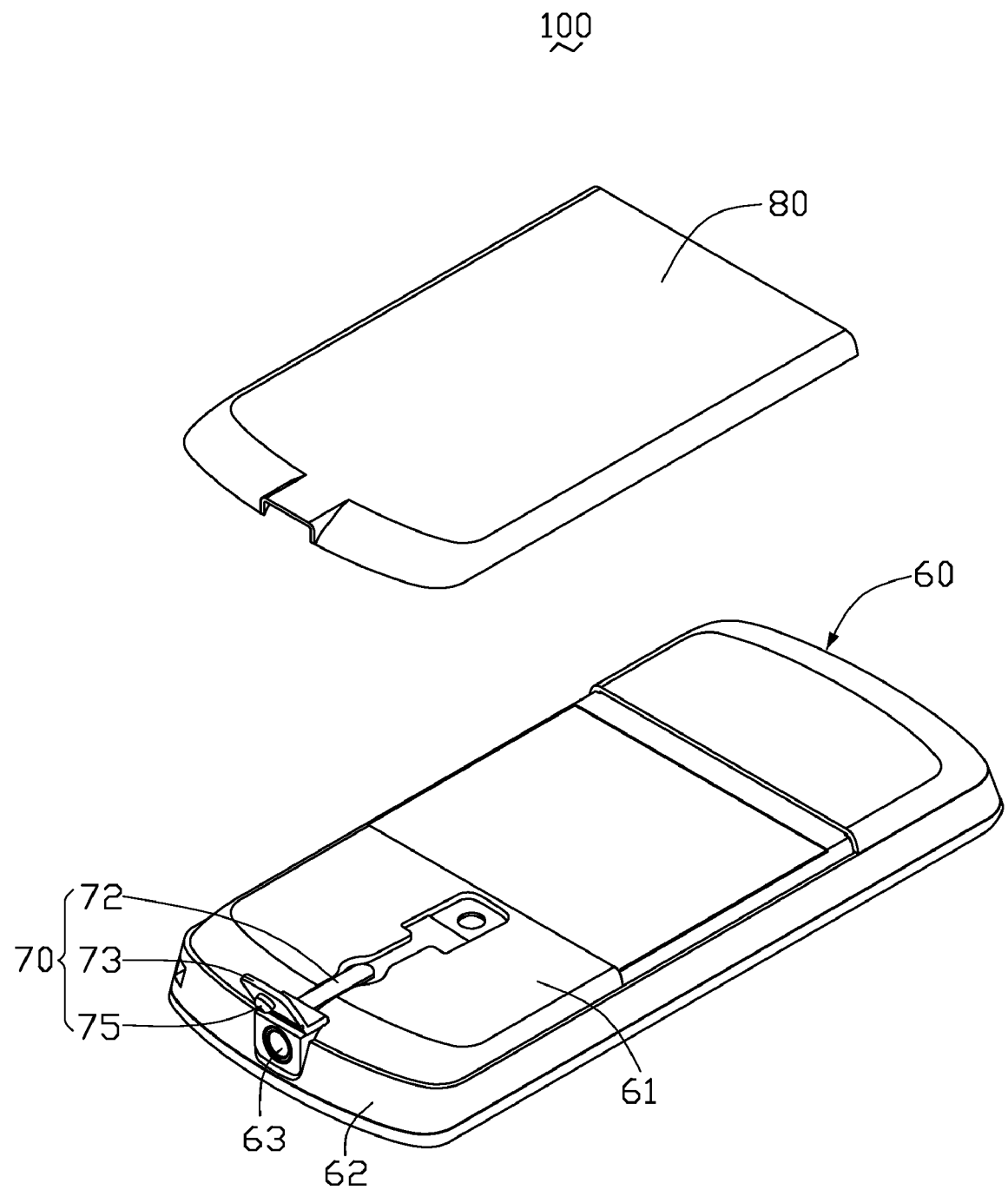
FIG. 2 is an partially exploded, isometric view of the housing mechanism shown in FIG. 1, showing the shield in a first position.
Figure 3:
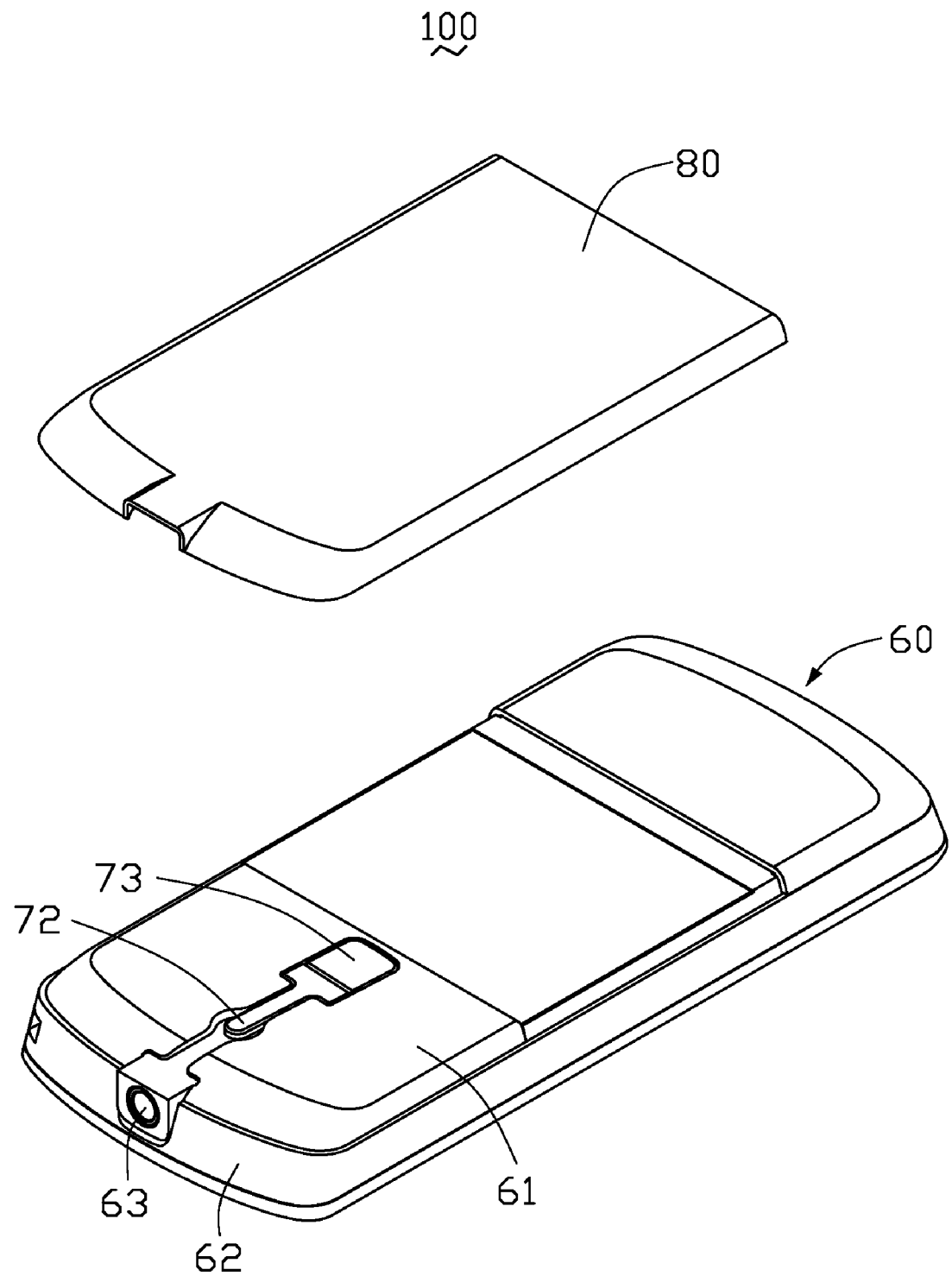
FIG. 3 is similar to FIG. 2 but showing the shield in a second position.
Figure 5:
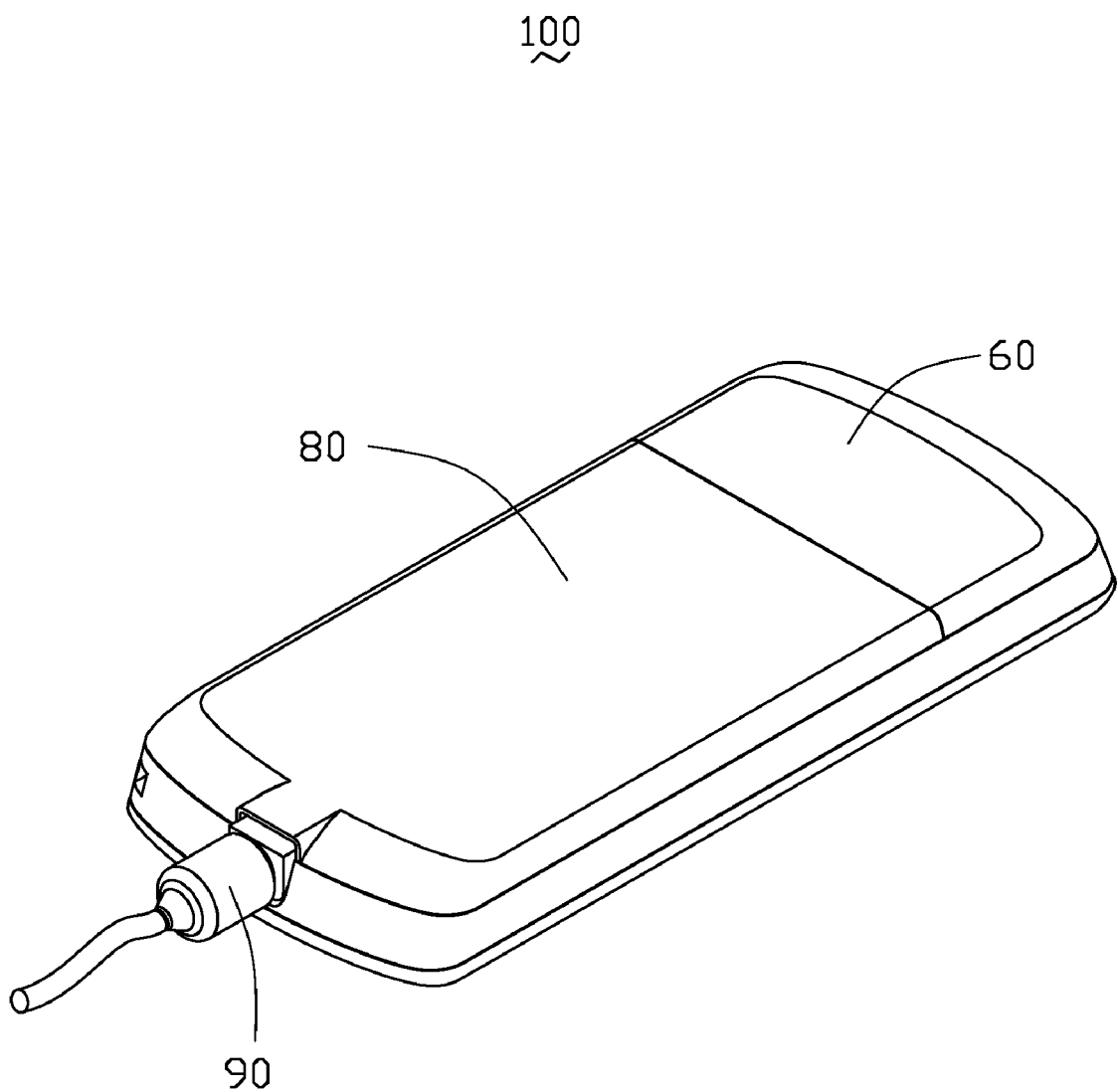
FIG. 5 is an assembled, isometric view of the housing mechanism shown in FIG. 3, with an outer interface provided.

Referring now to the drawings in detail, FIG. 5 shows a housing mechanism 100 used with a connector 90, according to the present embodiment. Also referring to FIGS. 1-3, the housing mechanism 100 includes a main body 60, a shield/cap 70, and a cover 80. The main body 60 defines a port 63 through which the connector 90 can be inserted into the main body 60. The shield 70 is attached to the main body 60 and is configured (i.e., structured and arranged) for covering the port 63 when no connector 90 is inserted into the main body 60.

The main body 60 includes a substantially-rectangular board portion (the primary board portion not being specifically labeled) and has an upper surface 61. A sidewall 62 extends substantially perpendicularly from the upper surface 61. The port 63 is defined in the sidewall 62. An inner interface (not shown) is provided in the main body 60 near the port 63. The connector 90 is configured for being inserted into the port 63, thereby engaging an outer interface (not shown) of the connector 90 with the inner interface of the main body 60 so as to transmit data or power, depending on the connection type, therebetween. The main body 60 defines a first receiving groove 64, a second receiving groove 65, a pin hole 66, and a receiving hole 67, all through the upper surface 61. The first receiving groove 64 is near the port 63 and communicates with the second receiving groove 65. The pin hole 66 communicates with the first receiving groove 64. The receiving hole 67 communicates with the second receiving groove 65. The cover 80 is substantially rectangular in shape and is configured for being mounted to the upper surface 61 of the main body 60.

The shield 70 includes a pin 71, a connecting pole 72, a lid 73, and a protrusion 75. The pin 71 extends perpendicularly from one end of the connecting pole 72 and is configured for being receivable in the pin hole 66 of the main body 60. The lid 73 is provided at the other opposite end of the connecting pole 72. The lid 73 hinges about a connection between the lid 73 and the connecting pole 72. The protrusion 75 extends substantially perpendicularly from a center of the lid 73. The connecting pole 72 and the lid 73 are configured for being selectably receivable in the first receiving groove 64 and the second receiving groove 65 of the main body 60. The pin 71 is configured for being receivable in the pin hole 66 of the main body 60. The protrusion 75 is configured for being selectably receivable in the port 63 and the receiving hole 67 of the main body 60.

Figure 4:
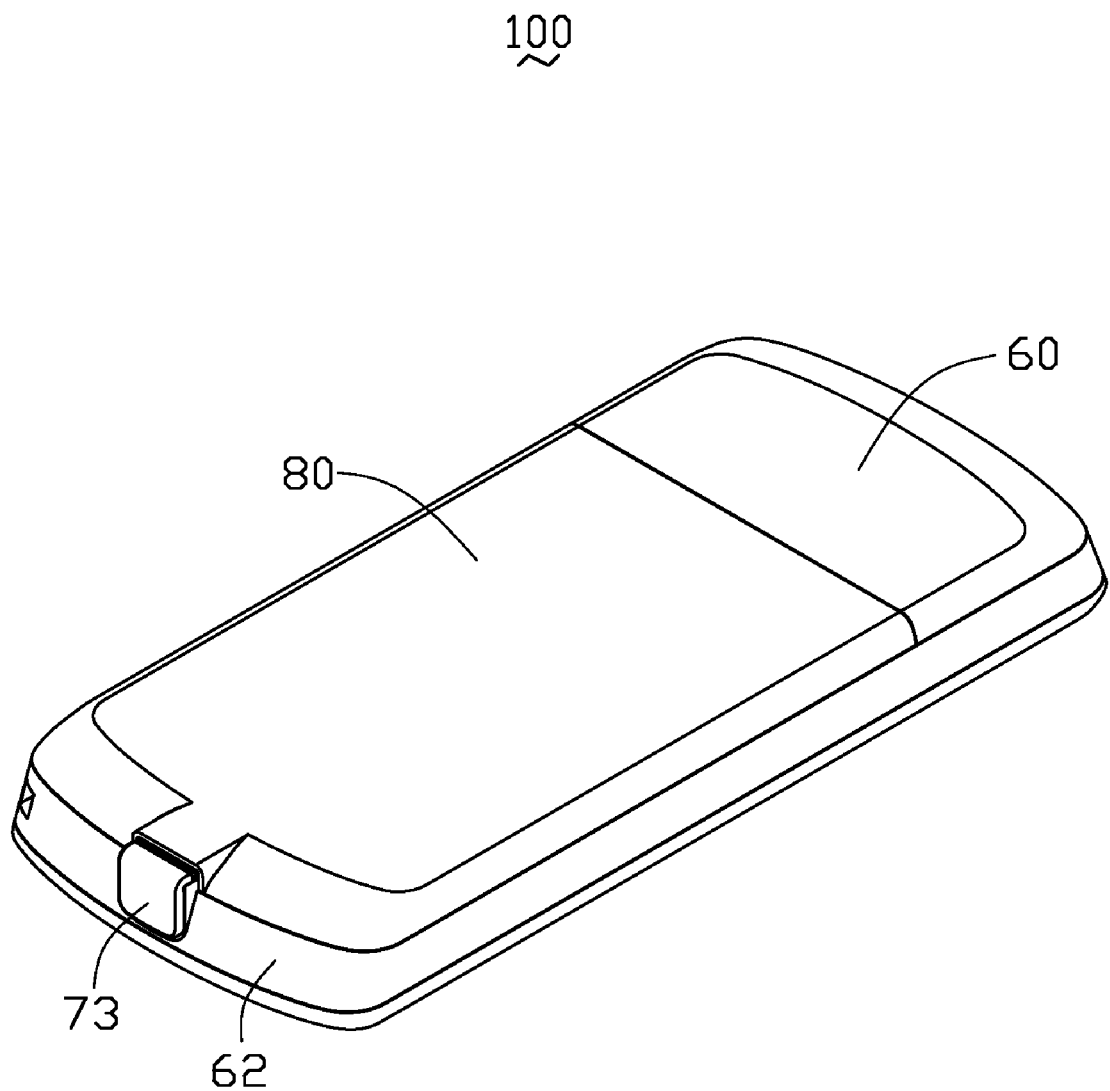
FIG. 4 is an assembled, isometric view of the housing mechanism shown in FIG. 3.

Also referring to FIG. 4, when no connector 90 is fixed to the housing mechanism 100, the shield 70 is advantageously located in a first position. The protrusion 75 is received in the port 63. The pin 71 is received in the pin hole 66, and the connecting pole 72 is received in the second receiving groove 65. The lid 73 is bent substantially perpendicularly to the connecting pole 72 and covers the port 63 of the main body 60. Hence, the port 63 is shielded/protected from, e.g., dust/moisture by the shield 70. The cover 80 is mounted to the main body 60.

Further referring to FIG. 5, when the housing mechanism 100 is used to connect to another device (not shown) for data transmission, the cover 80 is first moved away from the main body 60. Then, the lid 73 is bent up (i.e., flexibly rotated, e.g., about 90°), and the protrusion 75 is moved out of engagement with the port 63, until the lid 73 and the connecting pole 72 are at a substantially horizontal plane. Now, the port 63 is exposed outwardly. Then, the lid 73 and the connecting pole 72 are rotated about an axis of the pin 71 and away from engagement with the second receiving groove 64, until the lid 73 and the connecting pole 72 can be received in the first receiving groove 64. When the protrusion 75 is received in the receiving hole 67 of the main body 60, the shield 70 is in a second position, and the cover 80 is mounted to the upper surface 61. The connector 90 of the other device is then inserted into the port 63, and the inner interface may engage with the outer interface to transmit data or receive power, as per the connection. After the transmission of data or power is finished, the replacement of the shield 70 is a reverse process of the above-described operation.

It is to be understood that the port 63 may be defined in another portion of the main body. The first receiving groove 64 and the second receiving groove 65 may be defined in another portion of the main body or in the cover 80. In addition, the first receiving groove 64 and the second receiving groove 65 may be omitted and correspondingly the shield 70 may be directly mounted to a surface of the main body 60 or the cover 80. The first position and the second position may have any angle between 0 degrees and 360 degrees.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A housing mechanism for a portable electronic device, the housing mechanism comprising:
   a main body accommodating an inner interface, the main body defining a port and a pin hole therein, the port being configured for allowing an outer interface to be inserted into the main body and for thereby engaging the outer interface with the inner interface; and
   a shield located near the port, the shield being selectably positionable in a first position, in which the shield covers the port, and a second position, in which the shield is not covering the port, the shield including a connecting pole, a lid formed at one end of the connecting pole, and a pin perpendicularly formed at an opposite end of the connecting pole, and the pin being rotatably receivable in the pin hole.

2. The housing mechanism as claimed in claim 1, wherein a protrusion is formed on the lid of the shield, and the protrusion is configured for being receivable in the port.

3. The housing mechanism as claimed in claim 1, wherein the main body defines a first receiving groove therein, and the shield is configured for being receivable in the first receiving groove, when the shield is in the second position.

4. The housing mechanism as claimed in claim 3, wherein the main body defines a second receiving groove therein, and the shield is configured for being receivable in the second receiving groove, when the shield is in the first position.

5. The housing mechanism as claimed in claim 4, wherein the first receiving groove communicates with the second receiving groove.

6. The housing mechanism as claimed in claim 3, wherein the main body defines a receiving hole therein, a protrusion is formed on the lid of the shield, the protrusion is configured for being receivable in the port, and the receiving hole communicates with the first receiving groove and is configured for receiving the protrusion of the lid.

7. The housing mechanism as claimed in claim 1, wherein the main body has a sidewall and the port is defined in the sidewall.

8. The housing mechanism as claimed in claim 7, wherein the main body has an upper surface, the upper surface is oriented substantially perpendicular to the sidewall, and a first receiving groove is defined in the upper surface.

9. The housing mechanism as claimed in claim 8, further comprising a cover, wherein the cover is mounted to the upper surface of the main body for covering the shield in the second position.

10. The housing mechanism as claimed in claim 1, wherein the shield is rotatably mounted to the main body, and the first position and the second position have an angle therebetween.

11. The housing mechanism as claimed in claim 10, wherein a protrusion is formed on the lid of the shield and the protrusion is configured for being receivable in the port.

12. The housing mechanism as claimed in claim 11, wherein the main body defines a first receiving groove therein and the shield is configured for being receivable in the first receiving groove, when the shield is in the second position.

13. The housing mechanism as claimed in claim 12, wherein the main body defines a second receiving groove therein and the shield is configured for being receivable in the second receiving groove, when the shield is in the first position.

14. A housing mechanism for a portable electronic device, the housing mechanism comprising:
   a main body accommodating an inner interface, the main body defining a port and a first receiving groove therein, the port being configured for allowing an outer interface to be inserted into the main body and for thereby engaging the outer interface with the inner interface; and
   a shield located near the port, the shield being selectably positionable in a first position, in which the shield covers the port, and a second position, in which the shield is not covering the port, when the shield is in the second position, the shield is receivable in the first receiving groove.

15. The housing mechanism as claimed in claim 14, wherein the main body defines a second receiving groove therein, and the shield is configured for being receivable in the second receiving groove, when the shield is in the first position.

* * * * *